UNITED STATES PATENT OFFICE.

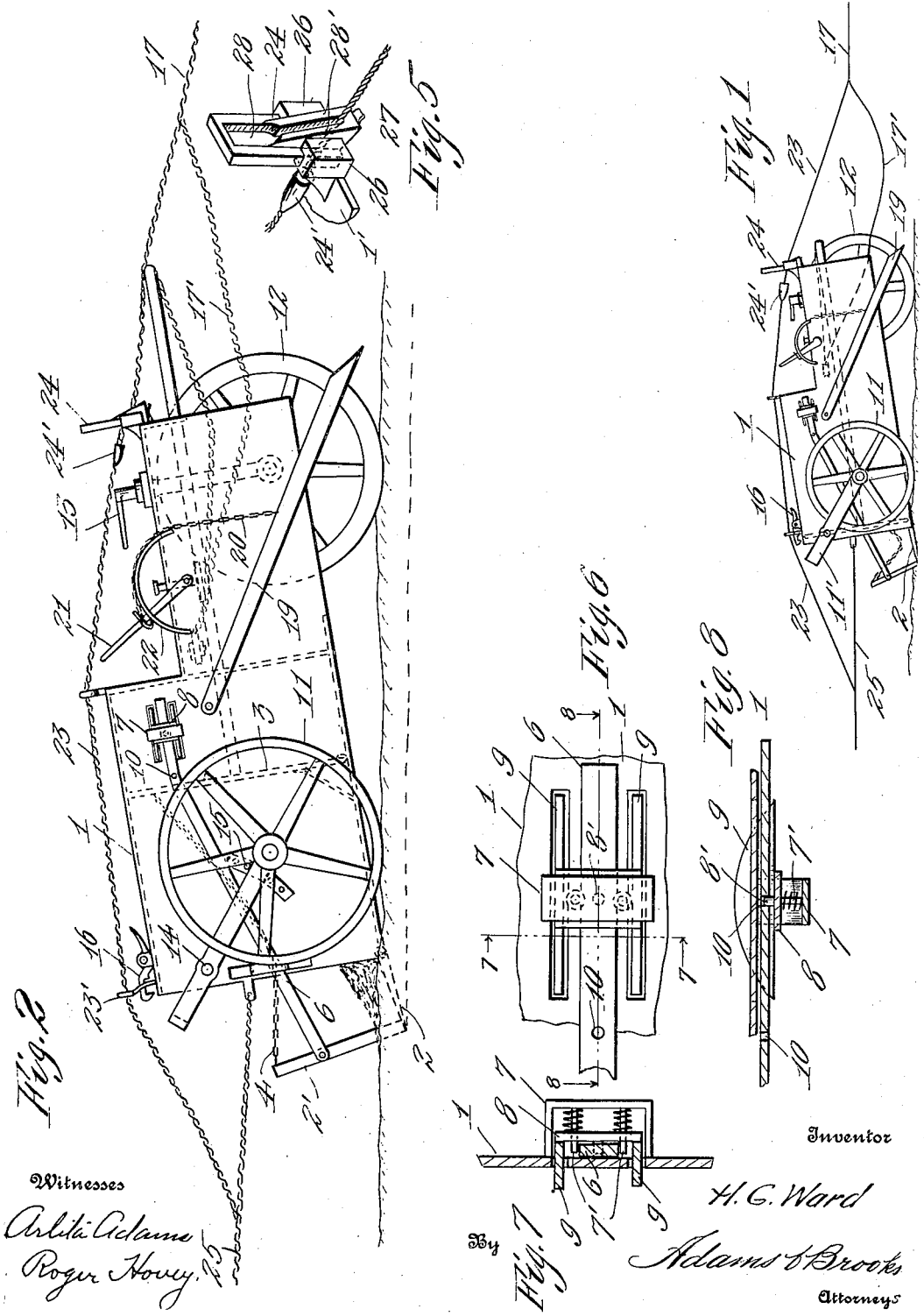

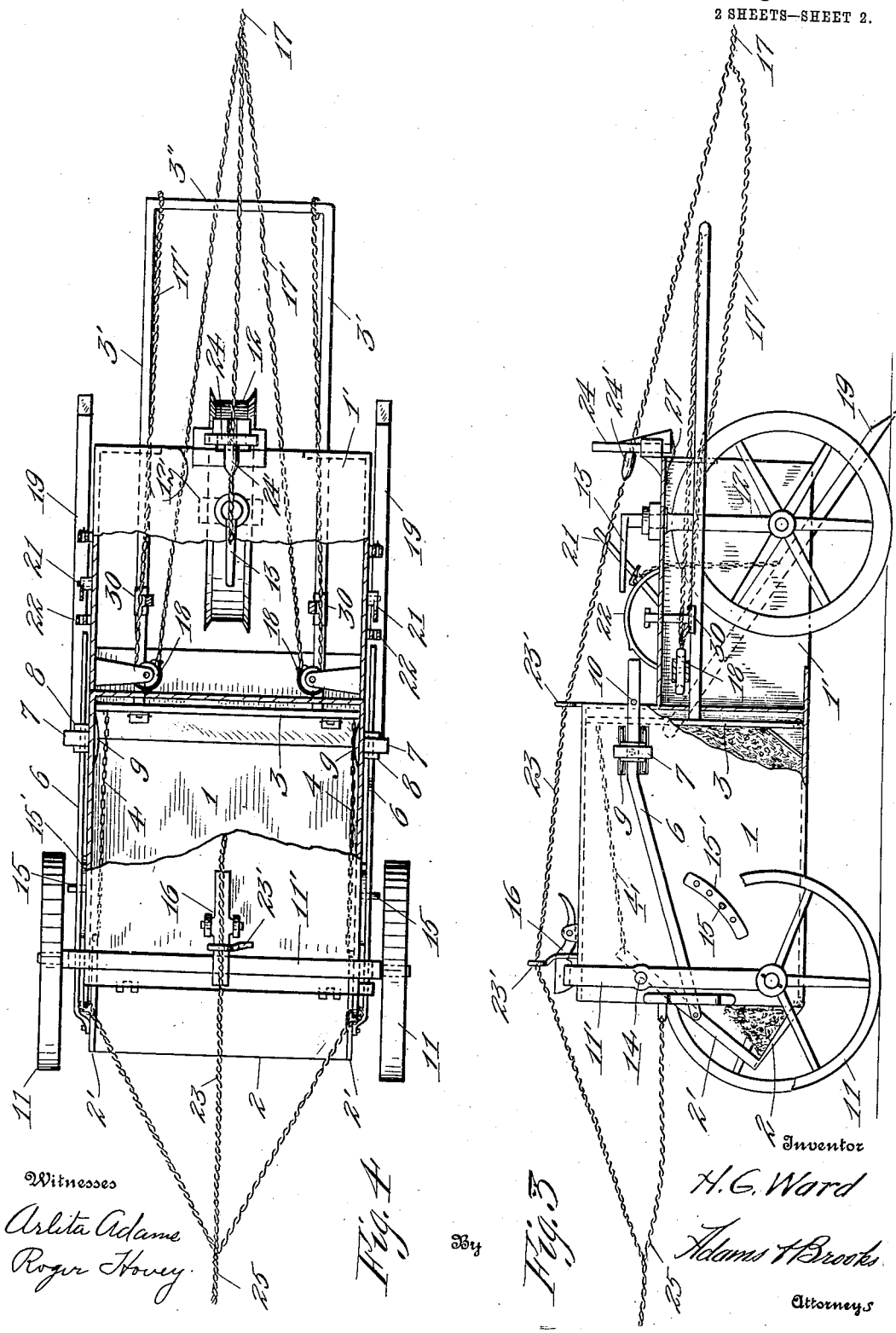

HARRIS G. WARD, OF VASHON, WASHINGTON.

EARTH-SCRAPING APPARATUS.

932,075.      Specification of Letters Patent.      Patented Aug. 24, 1909.

Application filed July 29, 1908. Serial No. 445,992.

*To all whom it may concern:*

Be it known that I, HARRIS G. WARD, a citizen of the United States of America, and a resident of the town of Vashon, in the county of King and State of Washington, have invented certain new and useful Improvements in Earth-Scraping Apparatus, of which the following is a specification.

My invention relates to certain improvements in apparatus for scraping and moving earth as hereinafter fully described and defined in the appended claims.

With reference to the accompanying drawing, wherein like reference numerals designate corresponding parts throughout: Figure 1 is a view in side elevation illustrating a scraping apparatus embodying the features of my invention, at the commencement of the scraping operation. Fig. 2 is a similar view of the scraping machine proper, the positions of the parts as shown being such as when the machine is partly loaded. Fig. 3 is a side elevation in partial section illustrating the positions of the parts when the machine is loaded and the operation of ejecting the material about to be effected. Fig. 4 is a plan view in partial section illustrating the machine with the plunger head at the rear of the box. Fig. 5 is a perspective view of the cable catch. Fig. 6 is a fragmentary detail view illustrating the latching device for the scraping blade, and Figs. 7 and 8 are sectional views taken on lines 7—7 and 8—8 respectively of Fig. 6.

The scraper as shown comprises a body portion in the form of a box, as 1, having hinged connection at its open end with a cutting or scraping blade 2.

Slidably fitting in box 1 is a plunger head 3 connected by means of chains 4 with upwardly extending arms 2' of blade 2 for swinging the latter upwardly during the loading operation of the scraper.

In connection with the scraper blade I have provided means for locking the same in cutting and raised positions. The said means comprising latching devices related to head 3 for operation and including bars 6 pivotally connected with respective arms 2' and extending rearwardly through brackets 7 of box 1. For each bar 6 I provide a spring pressed latch as 8, slidably supported on pins 7' of the adjacent bracket 7 and provided with suitable wipers 9 projecting through slots in the wall of box 1 into the path of head 3. Each latch 8 is provided with a lug or pin 8', and the bars 6 are provided with apertures, as 10, for engagement with respective pins when the blade 2 is in either its lowered or raised position.

Supporting the box 1 are bearing members or wheels 11—11 and 12 the latter of which is journaled in a yoke 12' rotatably mounted in the upper portion of a rearward extension 1' of said box and provided with a handle 13 for effecting angular adjustment of wheel 12 to steer the machine. The wheels 11 I have shown journaled on a yoke 11' embracing the forward end portion of box 1 and pivotally connected therewith as at 14 for relative swinging movement to lower the box at its forward end. This downward adjustment of the box should be regulated according to the depth of cut to be made and for this purpose I have provided adjustable stops, as 15, on box 1 for engagement with yoke 11' as the box swings downwardly. These stops are in the form of pins adapted to fit in either one of a series of apertures provided in respective plates 15' of box 1.

Reference numeral 16 designates a suitable catch mounted on box 1 for engagement with yoke 11' when the box is raised.

Bearing on the plunger arms 3' are shoes, as 30 provided with stem portions projecting from the upper wall of extension 1' for application of the foot of the operator to apply the shoes to retard rearward movement of the plunger as may be desired to effect a more complete filling of the box when operating in certain kinds of material as for example sand or dry earth.

The arms 3' are connected at the rear ends by a cross bar 3'' to which are secured cables 17' leading forwardly about respective guides 18 mounted in the forward portion of extension 1' and thence rearwardly to a haul back cable 17 to which power is applied to operate cables 17' to effect forward movement of the plunger. Pivotally mounted on box 1 are spuds 19 connected by means of chains 20 with respective levers 21 having suitable releasable connection with adjacent quadrants 22 to normally hold the spuds elevated. Should the materials excavated be densely packed in the box levers 21 may be released to permit the spuds to engage in the ground and secure the box from rearward movement when cables 17' are drawn upon to advance the plunger.

Reference numeral 23 designates a cable for relieving head 3 of cable 17 during the loading operation and also for resetting or raising the box from its scraping position. This cable is secured to cable 17 and passes through a suitable catch, as 24 mounted on the rear end of extension 1' and thence through guides 23' to the forward end of the machine where it is secured to a cable 25 connected with box 1 for advancing the machine.

Secured to cable 23 is a button 24' which normally lies forwardly of catch 24 for engagement therewith to elevate the box from its scraping position by rearward pull exerted on cable 17. Catch 24 is slidably mounted in guides 26 of extension 1', see Fig. 5, and held in normal position by a spring 27 which permits of adjustment of the catch to bring the enlarged portion 28 of its cable slot into position for free passage of button 24', when further rearward pull on cable 17 will fall on cables 17' to advance the plunger in box 1.

Button 24' is preferably tapered at the forward end and catch 24 provided on its rear face with inclined surfaces as 28' for guiding the button upon its return to the enlarged portion 28 of the cable slot.

In operation the plunger head 3 is first moved to the forward end of the box by pulling on cable 17 with button 24' rearwardly of catch 24. This movement of cable 17 will draw cables 23 and 25 rearward as the plunger advances under action of cables 17' and also effect operation of the latches 8 to release bars 6 by engagement of head 3 with wipers 9. Blade 2 will then swing downwardly as permitted by the slack in chains 4 until bars 6 are sufficiently advanced for engagement of the latches 8 by action of their springs in the rearward apertures 10 of said bars. After the plunger head has been advanced a forward pull is exerted on cable 25 thereby drawing cable 17 forwardly to slack cables 17' and passing button 24' through catch 24. Box 1 is then released for lowering movement by disengaging catch 16 from yoke 11' and the scraping operation commenced by drawing on cable 25 which draws upon cable 17 through cable 23 and thereby relieves the plunger. The materials excavated ride up blade 2 into the box and force head 3 rearwardly into engagement with wipers 9 to release bars 6 just as chains 4 are drawn taut. Further inward movement of the head will therefore swing blade 2 upwardly and thereby adjust bars 6 inwardly for re-engagement with their latches to secure the blade in its raised position.

After the machine is loaded a rearward pull may be exerted on cable 17 with button 24' engaging catch 24 to swing yoke 11' to an upright position and thereby elevate the box clear of the ground to facilitate movement of the machine to where the material is to be deposited. The operation of the machine to eject the materials is effected by first adjusting catch 24 for passage of button 24' and then drawing on cable 17 to move head 3 forwardly as heretofore described and thereby crowd the material from box 1 and operate latches 8 to release blade 2.

Having thus described my invention, what I claim as new, and desire to secure by Letters Patent of the United States of America, is:

1. An earth scraping apparatus comprising a scraper, bearing members on which said scraper is supported for swinging, a draft cable, a rearwardly extending cable having connection to effect swinging of said scraper to elevate the same, and means for holding said scraper elevated.

2. An earth scraping apparatus comprising a scraper, a draft cable connected thereto, means supporting said scraper for vertical adjustment, a rearwardly extending cable connected to said draft cable, means for connecting said last named cable with said scraper whereby the pulling rearwardly of said cable will effect the elevation of said scraper, and means for holding said scraper elevated.

3. An earth scraping apparatus comprising a scraper, a draft cable connected thereto, a plunger supported for movement in said scraper, means on which said scraper is supported for vertical adjustment, means for holding said scraper in elevated position, and means for operating said plunger to discharge material from said scraper.

4. An earth scraping apparatus comprising a scraper, means on which said scraper is supported for vertical adjustment, means for holding said scraper in elevated position, a draft cable connected to said scraper, a plunger slidably supported in said scraper, a cable connected to said plunger for operating the same to discharge material from said scraper and means for elevating said scraper connected to said last named cable to be operated thereby.

5. An earth scraping apparatus comprising a scraper, means on which said scraper is supported for vertical adjustment, means for holding said scraper in elevated position, a draft cable connected to said scraper, a plunger slidably supported in said scraper, a cable connected to said plunger for operating the same to discharge material from said scraper, a cable connected to said draft cable and to said second named cable, means whereby said last named cable is connected with said scraper to elevate the same.

6. An earth scraping apparatus comprising a scraper, means on which said scraper is supported for vertical adjustment, means for holding said scraper in elevated position, a draft cable connected to said scraper, a plunger slidably supported in said scraper, a cable connected to said plunger for operating the same to discharge material from said scraper, a cable connected to said draft cable and to said second named cable, said last named cable being so connected with said second named cable that power applied to the former before operating said plunger, a catch on said scraper, and means on said last named cable for engagement with said catch to connect said scraper for movement with said cable.

7. A scraping apparatus comprising a scraper, supporting wheels therefor, means in said scraper for discharging material therefrom, and means for engagement with the earth for holding said scraper against backward movement supported on said scraper for upward movement.

8. A scraping apparatus comprising a scraper, supporting wheels therefor, means in said scraper for discharging material therefrom, and members pivoted to said scraper for downward movement adapted to engage in the earth and prevent backward movement of said scraper during unloading thereof.

9. A scraping apparatus comprising a scraper consisting of an open body portion and a forwardly disposed scraping member hinged for vertical swinging, means to swing said scraping member upwardly, and means for locking said scraping member in its lowered position against swinging in both upward and downward directions.

10. A scraping apparatus comprising a scraper consisting of an open body portion and a forwardly disposed scraping member supported for upward movement, a plunger slidably supported in said body portion and connected to said scraping member to raise the same, means to operate said plunger, means to lock said scraping member in its elevated position, including a rigid connecting means and a latch engaged therewith and means operated by said plunger to release the latch of said locking means.

11. A scraping apparatus comprising a scraper consisting of an open body portion and a forwardly disposed scraping member supported for upward movement, a plunger slidably supported in said body portion and connected to said scraping member to raise the same, means to operate said plunger, means to lock said scraping member in both its raised and lowered positions, against movement in either direction and means operated by and during movement of said plunger for actuating said locking means to release said scraping member.

12. A scraping apparatus comprising a scraper consisting of an open body portion and a forwardly disposed scraping member supported for upward movement, a plunger slidably supported in said body portion and connected to said scraping member to raise the same, means to operate said plunger, means to lock said scraping member in its lowered position, against movement in either direction and means operated by said plunger during inward movement thereof to actuate said locking means to release said scraping member.

13. A scraping apparatus comprising a scraper consisting of an open body portion and a scraping member pivotally supported at the forward end thereof for vertical swinging, a plunger mounted for reciprocation in said body portion, a connection between said plunger and said scraping member whereby said scraping member will be swung upwardly during rearward movement of said plunger, an arm connected with said scraping member, a catch on said body portion for holding said arm and thereby preventing movement of said scraping member, and means operated by and during movement of said plunger for actuating said catch to release said arm.

14. A scraping apparatus comprising a scraper consisting of an open body, a bearing member holding the rear portion of said scraper elevated, bearing members for supporting the forward end portion of said scraper, and means carrying said last named bearing members, said means being pivoted to said scraper for swinging, whereby to permit of lowering of the forward end portion of said scraper.

15. A scraping apparatus comprising a scraper consisting of an open body, bearing means on which said scraper is supported for vertical swinging, means to swing said scraper to raise and lower the forward end thereof, bearing members at the forward end portions of said scraper, means carrying said bearing members, said last means being pivoted to said scraper for vertical swinging, and means for holding said last means as adjusted.

16. An earth scraping apparatus comprising a scraper, a draft cable connected thereto, a plunger movable in the scraper by the materials as loaded, a cable connected with said plunger to operate the same, and means for connecting said draft cable to said last cable to relieve the plunger thereof in loading.

17. An earth scraping apparatus comprising a scraper, a draft cable connected therewith, a plunger movable in said scraper toward and from its active end, a haul back cable connected with said plunger to advance the same, and means for connecting said draft cable with said last named cable to relieve the plunger thereof during rearward movement of the latter in the scraper.

18. An earth scraping apparatus comprising a scraper, a draft cable connected therewith, a plunger movable in said scraper toward and from its active end, a haul back cable connected with said plunger to advance the same, and flexible means connecting said cables for drawing one cable toward the scraper by draft on the other.

19. An earth scraping apparatus comprising a scraper, a draft cable connected therewith, a plunger in said scraper, a haul back cable, a guide means on the scraper, flexible means connected with said plunger and haul back cable and engaging said guide means to advance the plunger, and flexible means connecting said cables for drawing one cable toward the scraper by draft on the other.

Signed at Seattle, Washington, this 18 day of July, 1908.

HARRIS G. WARD.

Witnesses:
  F. C. BLOXOM,
  S. LARSEN.